Sept. 28, 1937.   R. H. SWART   2,094,195
OIL FILTER
Filed Oct. 4, 1935   2 Sheets-Sheet 2
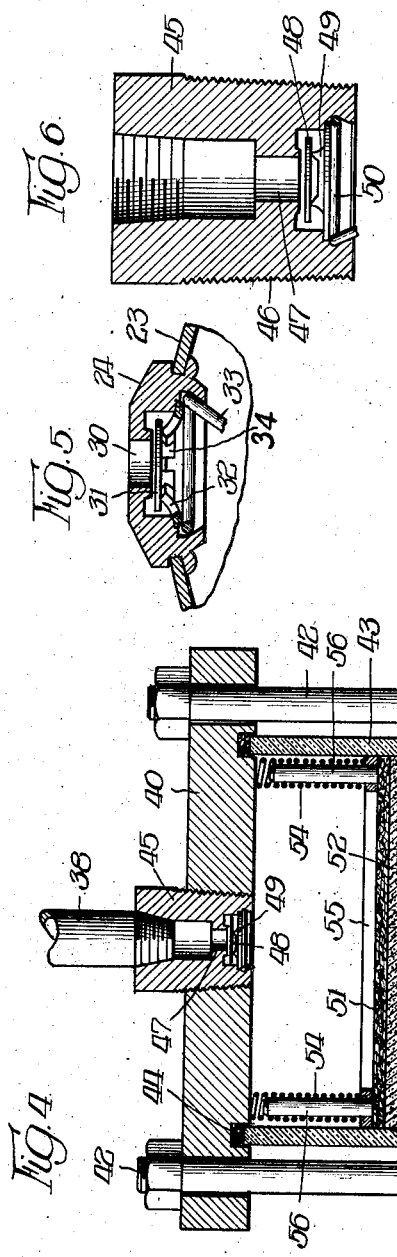
Inventor:
Richard H. Swart,
By Williamson, Huxley, Byron & Knight
attys Patented Sept. 28, 1937

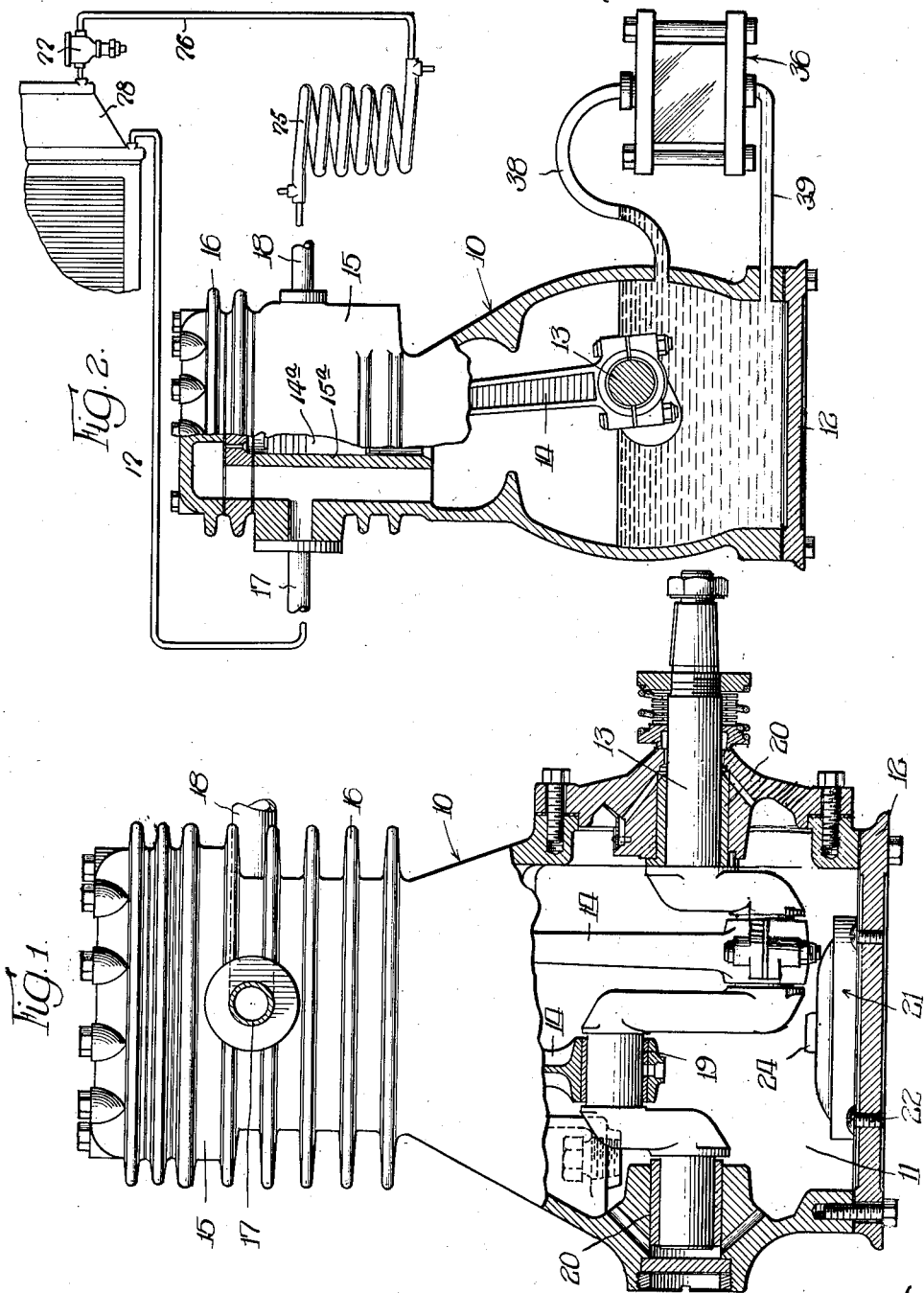

2,094,195

UNITED STATES PATENT OFFICE 2,094,195

OIL FILTER

Richard H. Swart, Beloit, Wis., assignor to General Refrigeration Corporation, Beloit, Wis., a corporation of Delaware Application October 4, 1935, Serial No. 43,485

5 Claims. (Cl. 123—196)

The invention relates to refrigerating apparatus and has particular reference to novel means for filtering the crankcase oil in the refrigeration compressor.

Filters have heretofore been used on refrigerating compressors but they have always been of the pressure type employing a mechanically operated displacement pump. It is very desirable to filter the crankcase oil of the compressor as the operating efficiency of the same is seriously impaired by accumulations of grit and dirt in the oil. A small amount of oil is constantly being pumped into the discharge and this oil gradually works through the system until it is eventually returned to the crankcase through the suction line. The returned oil is contaminated with grit and dirt which accordingly accumulates in the oil reservoir of the compressor.

It is an object of the invention to provide means that will filter the crankcase oil of refrigeration compressors and which will not require any auxiliary pump since this additional equipment would add to the cost of the compressor and is further undesirable because of the numerous working parts.

In one embodiment of the invention shown in the drawings the filter is located in the bottom of the compressor and may be completely submerged by the oil. When the compressor is running the crankcase pressure will be substantially equal to the suction pressure of the machine, which may approximate twenty pounds per square inch. It may be assumed, therefore, that this pressure will exist both inside and outside of the oil filter. When the compressor is stopped the pressure in the crank case increases until it reaches the normal shut-down pressure of the machine which may be assumed as approximately fifty pounds per square inch. As the pressure builds up within the crankcase, oil will be forced into the oil filter, the opening in the oil filter being provided with a check valve which opens when the external pressure exceeds the internal pressure. When the compressor again startes the crank case pressure is immediately reduced, with the result that the check valve will be caused to close, preventing the oil within the filter from leaving through this opening.

The crankcase pressure will soon reach its lower limit of approximately twenty pounds per square inch but the higher pressure inside the oil filter still exists, and the oil is accordingly forced through the filtering medium of the same and is discharged through the base openings of the filter. When the compressor again stops the external oil pressure will begin to build up over the internal oil filter pressure and the check valve will open permitting a new charge of oil to enter the filter.

A more specific object of the invention, therefore, is to provide filtering means for cleaning crankcase oil of refrigerating compressors which will operate automatically, forcing a quantity of the oil through the filtering medium thereof at each change of pressure within the crankcase.

Another object resides in the provision of an oil filter having a check valve adapted to be alternately opened and closed responsive to changes in pressure exterior of the filter.

With these and various other objects in view, the invention may consist of certain novel features of construction and operation, as will be more fully described and particularly pointed out in the specification, drawings and claims appended hereto.

In the drawings which illustrate an embodiment of the invention and wherein like reference characters are used to designate like parts—

Figure 1 is an elevational view of a compressor, parts being broken away to show the interior of the crankcase and the location of the oil filter forming the subject matter of the invention;

Figure 2 is an elevational view of a similar compressor, shown as forming part of a complete refrigerating system of the compression-expansion type and which compressor has associated therewith a modified form of filter.

Figure 3 is a vertical sectional view through the oil filter shown in Figure 1;

Figure 4 is a vertical sectional view of the oil filter shown in Figure 2;

Figure 5 is an enlarged sectional view of the check valve for the filter shown in detail in Figure 3;

Figure 6 is an enlarged sectional view of the check valve for the filter shown in detail in Figure 4;

Figure 7 is a vertical sectional view showing still another modified form of filter; and Figure 8 is a fragmentary vertical sectional view showing a modified construction of filter similar to Figure 7.

Referring to the drawings the refrigeration compressor of Figures 1 and 2 consists of a body member or casting identified in its entirety by 10 and which casting provides a crankcase portion 11 closed by a removable bottom plate 12. The crankcase journals a crank shaft 13 having associated therewith a pair of connecting rods 14. The rods in turn actuate pistons 14a, Figure 2 which reciprocate within cylinders 15a provided by the cylinder portion 15 of the compressor, which portion is exteriorly formed with a plurality of fins 16 for dissipating the heat caused by the work done in compressing the refrigerating gas. The high temperature, high pressure refrigerant gas is delivered by the compressor to the discharge line 18 joining with a condenser 75 for cooling the gas, the gas thereby being changed into a liquid and being delivered to a supply line 76. The expansion valve 77 of the conventional type regulates the admission of the liquid refrigerant to the evaporator 78 wherein the refrigerant evaporates, producing the well known cooling effect. The refrigerant gas is conducted from the evaporator by the suction line 17 which joins with the compressor as shown in Figure 2. The gas enters a chamber provided by the cylinder 15 of the compressor which chamber communicates with the crankcase thereof. It will be clear from the foregoing disclosure that a high gas pressure within the crankcase of the compressor will result when the compressor is at rest due to the fact that refrigerant gas is constantly being returned by the suction line 17. The pressure within the crankcase will eventually equal that within the evaporator. However, upon operation of the compressor the gas pressure is rapidly reduced until the pressure within the crankcase is equalized with the suction pressure of the machine.

The crankcase 11 of the compressor provides a reservoir for oil into which the lower ends of the connecting rods 14 dip during operation of the compressor to replenish the supply of oil to the connecting rod bearings 19 and which splashes sufficient oil within the crankcase to maintain the bearings 20 of the crank shaft 13 also supplied with oil. The filter of the invention is designated in its entirety by numeral 21, Figure 1 and is adapted to be located in the base of the crankcase on the removable plate 12 and may be conveniently held in position thereon by screws 22. As better shown in Figure 3 the filter consists of a casing 23 having a check valve 24 fixedly secured centrally of the casing in the upper portion thereof and having a perforated base 25. Openings 26 are provided in the casing below the perforated base to permit discharge of the oil. The filtering medium located in the casing 23 comprises a disc 27 of felt positioned above a stone filter 28. The check valve 24 provides an opening 30 for the oil, Figure 5, the valve proper consisting of a disc 31 positioned below the opening 30 and supported on a cone-shaped ring 32 which is retained in position by the spring clip 33. The ring 32 has a plurality of openings 34 therein to permit the oil flowing through opening 30 to reach the interior of the filter. When the disc 31 is forced upwardly the opening 30 is closed to prevent the flow of oil to the filter.

The filter above described is adapted to be submerged by the oil in the crankcase of the compressor and during the shutdown period of the compressor the gas pressure will build up until it reaches, for example, a pressure of approximately fifty pounds per square inch. When the compressor is at rest the check valve will be open, the disc 31 assuming the position shown in Figure 3 to permit oil to enter the filter. This shutdown pressure is rapidly reduced after the compressor begins operation and as the gas pressure approaches its lower limit of approximately twenty pounds per square inch, for example, the check valve will be caused to close due to the higher oil pressure within the filter and therefore oil trapped in the filter will be forced through the filtering mediums 27 and 28 and will be eventually discharged through the openings 26 below the perforated base 25. This operation will equalize the pressure within the filter with that outside the filter and the check valve will therefore open, admitting another charge of oil to the filter. The operations above described occur during each normal cycle of the refrigeration machine and for each cycle the complete contents of the filter is forced through the filtering medium thereof.

Figure 2 shows a compressor having the crankcase portion thereof connected to a modified form of filter designated in its entirety by numeral 36, which in this instance is located exterior of the compressor. A pipe 38 leads from the upper portion of the crankcase to the top of the filter 36 and a return pipe 39 connects the base of the filter with the bottom portion of the crankcase. The filter more particularly shown in Figure 4 comprises upper and lower plates 40 and 41, respectively, each plate being provided with a plurality of openings for receiving the securing bolts 42 which join said plates, confining the annular glass member 43 therebetween. Gaskets 44 are positioned in annular recesses formed on the opposed surfaces of the plates, providing means against which the upper and lower edges of the annular glass member 43 engage to seal the joints thus formed, preventing the escape of oil from the interior of the glass member. The supply pipe 38 has threaded connection with the check valve 45, Figure 6, which in turn is removably secured to the upper plate 40 as by threads 46. The pipe 38 delivers oil through an opening 47 below which is positioned the valve proper in the form of a disc 48 which is supported on a ring 49 retained in position by the spring clip 50. The ring 49 has a plurality of openings therein to permit the oil flowing through opening 47 to reach the interior of the filter, which flow of oil takes place only when the disc is in position as shown in Figure 6, since when the disc is forced upwardly opening 47 is closed and further flow of oil to the filter is prevented.

The filtering mediums located within the glass member 43 comprise a layer of felt 51 positioned over a stone filter 52 which in turn is supported on a screen 53 of proper mesh. The discharge pipe 39 has threaded connection with bottom member 41 and conducts the oil from the filter to the crankcase of the compressor. The felt pad 51 and the stone filter 52 are retained in the base of the filter by the coil springs 54 which are confined between member 40 and a ring 55, the latter resting on the felt pad 51 and having upstanding studs 56 over which the coil springs 54 are telescoped.

The operation of this form of filter is similar to that described with respect to that of Figure 1, the oil from the crank case being caused to enter the filter during the shut-down period of the compressor when the pressure within the crankcase gradually builds up to a maximum. The drop in said pressure after operation of the compressor results in the oil trapped within the filter being forced through the filtering mediums 51 and 52 thereof, whereupon the oil is returned to the compressor by pipe 39.

In Figure 7 a type of filter is shown having its base submerged by the oil in the crankcase but wherein the check valve of the filter is located above the oil level. The body portion or casing 58 of the filter is substantially cylindrical and somewhat elongated, having a necked-in portion at the top and a flaring portion 59 at the base thereof. Said flaring portion has interfitting engagement with the base member 60 which is perforated, having a plurality of openings 61 to permit the oil to escape from the filter. Numeral 62 indicates a filtering medium which may consist of any satisfactory material and which is held in position on the base member by the flaring portion 59 of the filter body. The check valve 63 is suitably mounted on the upper end of the cylindrical body 58 and retains the valve disc 64 between the inlet opening 65 and the top portion of the filter body 58, which portion is formed with openings 66. During the operating period of the compressor oil is splashed into the cup-shaped recess 67 leading to the opening 65, keeping the recess full of oil. Also during this period filtration of the oil within the filter occurs. While the compressor is at rest the gas pressure in the crankcase builds up, as previously described, and the oil retained by the cup 67 enters the filter through opening 65. Upon subsequent operation of the compressor this oil is filtered and another charge of oil is supplied to the cup 67 by the splashing of the oil as described.

Figure 8 shows an optional construction for the base portion of the filter shown in Figure 7. The cylindrical body 58 has a flaring bottom portion, providing a shoulder 68 and a laterally disposed base 70. The base is suitably secured by screws 71 which retain in position under the flaring bottom portion of the filter a screen 72. The filtering medium of the device is indicated by numeral 73 and is held in place by shoulder 68. It is understood that this form of filter will be equipped with a check valve similar to that shown in Figure 7 and which may extend above the oil level in the crankcase.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. The combination with a compressor forming part of a refrigerating system operating on a volatile refrigerant, of means for cleaning the oil in the crankcase of said compressor to prevent accumulations of grit and dirt in said oil comprising a filter, said filter having automatic operation and being supplied with a charge of oil during each shut-down period of the compressor which oil is filtered during the next running period of the compressor.

2. The combination with a compressor forming part of a refrigerator system operating on a volatile refrigerant, said compressor having a high crankcase pressure during shut down periods thereof and having a pressure substantially equaling the suction pressure of the machine during operating periods, of means for cleaning the oil in the crankcase of said compressor to prevent accumulations of grit and dirt in said oil comprising a filter, said filter having an inlet and exit for the oil, a check valve for the inlet, and filtering mediums associated with the exit, said check valve automatically opening to admit a charge of oil to the filter during each shut-down period of the compressor, and closing during the next running period of the compressor to cause filtration of the charge.

3. The combination with a compressor forming part of a refrigerator system operating on a volatile refrigerant, said compressor having a high crankcase pressure during shut down periods thereof and having a pressure substantially equaling the suction pressure of the machine during operating periods, of means for cleaning the oil in the crankcase of said compressor to prevent accumulations of grit and dirt in said oil comprising a filter, said filter having an inlet and exit for the oil, a check valve for the inlet adapted to open and close upon changes in pressure within the crankcase, whereby a quantity of oil is successively admitted to the filter when the valve is open and filtered when the valve is closed.

4. The combination with a compressor of the reciprocating type having a crankcase forming a reservoir for a quantity of oil, said compressor forming part of a refrigerating system operating on a volatile refrigerant and having a high crankcase pressure during shut down periods thereof and a pressure substantially equaling the suction pressure of the machine during operating periods, of a filter for cleaning said oil, said filter being submerged by said oil and having an inlet equipped with a check valve, said check valve automatically opening admitting a charge of oil to the filter when a relatively high pressure exists in the crankcase, and automatically closing when a relatively low pressure exists in the crankcase, whereby filtration of the charge of oil in the filter results.

5. The combination with a compressor of the reciprocating type having a crankcase forming a reservoir for a quantity of oil, said compressor forming part of a refrigerating system operating on a volatile refrigerant and having a high crankcase pressure during shut down periods thereof and a pressure substantially equaling the suction pressure of the machine during operating periods, of a filter for cleaning said oil, an inlet for said filter equipped with a check valve, said valve automatically opening admitting a charge of oil to the filter during each shut-down period of the compressor when a relatively high pressure exists in the crankcase, and said valve automatically closing during operation of the compressor when a relatively low pressure exists in the crankcase, whereby filtration of the charge of oil in the filter occurs when the valve is closed.

RICHARD H. SWART.